US011862104B2

(12) United States Patent
Heo et al.

(10) Patent No.: US 11,862,104 B2
(45) Date of Patent: Jan. 2, 2024

(54) GATE DRIVER AND DISPLAY DEVICE INCLUDING THE SAME

(71) Applicant: LG DISPLAY CO., LTD., Seoul (KR)

(72) Inventors: Seung Ho Heo, Paju-si (KR); Hun Ki Shin, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 17/954,284

(22) Filed: Sep. 27, 2022

(65) Prior Publication Data

US 2023/0112514 A1 Apr. 13, 2023

(30) Foreign Application Priority Data

Oct. 8, 2021 (KR) ........................ 10-2021-0133836
Dec. 8, 2021 (KR) ........................ 10-2021-0174802

(51) Int. Cl.
*G09G 3/3266* (2016.01)
*G09G 3/3233* (2016.01)
*G09G 3/3291* (2016.01)

(52) U.S. Cl.
CPC ......... *G09G 3/3266* (2013.01); *G09G 3/3291* (2013.01); *G09G 2300/0426* (2013.01); *G09G 2300/0852* (2013.01); *G09G 2310/0278* (2013.01)

(58) Field of Classification Search
None
See application file for complete search history.

(56) References Cited

U.S. PATENT DOCUMENTS 9,728,152 B2 * 8/2017 Jo .......................... G11C 19/28
2014/0354523 A1 * 12/2014 So ........................ G09G 3/3677 345/100
2015/0002504 A1 * 1/2015 Jo ........................ G09G 3/3677 345/99
2019/0164499 A1 * 5/2019 Wu ...................... G09G 3/3266

FOREIGN PATENT DOCUMENTS

KR 10-2020-0025882 A 3/2020
KR 10-2021-0075851 A 6/2021
KR 10-2021-0086516 A 7/2021

* cited by examiner

*Primary Examiner* — Sepehr Azari
(74) *Attorney, Agent, or Firm* — Morgan, Lewis & Bockius LLP

(57) ABSTRACT

A gate driver may include: a controller to charge and discharge a first control node that pulls up an output voltage and a second control node that pulls down the output voltage; a first output unit having a first pull-up transistor to apply a gate high voltage to an output node in response to a charging voltage of the first control node, and a first pull-down transistor to apply a gate low voltage to the output node in response to a charging voltage of the second control node; and a switch unit to change a current path between a first output node and a first power line to which a high potential voltage is applied or a second power line to which a first clock signal is applied according to a carry signal transmitted from a previous signal transmission unit and a voltage level of the second control node.

25 Claims, 13 Drawing Sheets

GATE DRIVER AND DISPLAY DEVICE INCLUDING THE SAME

CROSS-REFERENCE TO RELATED APPLICATION

This application claims priority to and the benefit of Korean Patent Application No. 10-2021-0133836, filed on Oct. 8, 2021, and Korean Patent Application No. 10-2021-0174802, filed on Dec. 8, 2021, the disclosure of which is incorporated herein by reference in its entirety.

BACKGROUND

1. Technical Field of the Invention

The present disclosure relates to a gate driver and a display device including the same.

2. Discussion of the Related Art

Display devices includes a liquid crystal display (LCD) device, an electroluminescence display device, a field emission display (FED) device, a plasma display panel (PDP), and the like.

Electroluminescent display devices are divided into inorganic light emitting display devices and organic light emitting display devices according to a material of a light emitting layer. An active-matrix type organic light emitting display device reproduces an input image using a self-emissive element which emits light by itself, for example, an organic light emitting diode (hereinafter referred to as an "OLED"). An organic light emitting display device has advantages in that a response speed is fast and luminous efficiency, luminance, and a viewing angle are large.

Some of display devices, for example, a liquid crystal display device or an organic light emitting display device includes a display panel including a plurality of sub-pixels, a driver outputting a driving signal for driving the display panel, a power supply generating power to be supplied to the display panel or the driver, and the like. The driver includes a gate driver that supplies a scan signal or a gate signal to the display panel, and a data driver that supplies a data signal to the display panel.

In such a display device, when a driving signal such as a scan signal, an EM signal, and a data signal is supplied to a plurality of sub-pixels formed in the display panel, the selected sub-pixel transmits light or emits light directly to thereby display an image.

In this case, the gate driver has a structure of a CLK application method and a structure of a VDD application method. The CLK application method applies a CLK voltage and has an excellent output characteristic, but since the CLK is alternately applied at a high voltage and a low voltage, a floating section is present. The VDD application method applies a VDD voltage and has no floating section, but since the output is generated using only on/off of a thin-film transistor (TFT), a rising time and a falling time of an output signal are slow.

SUMMARY

Accordingly, embodiments of the present disclosure are directed to a gate driver and a display device including the same that substantially obviate one or more of the problems due to limitations and disadvantages of the related art.

An aspect of the present disclosure is to provide a gate driver having an excellent output characteristic and capable of eliminating a floating section and a display panel including the same.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts, as embodied and broadly described herein, a gate driver comprises: a controller configured to charge and discharge a first control node that pulls up an output voltage and a second control node that pulls down the output voltage; a first output unit including a first pull-up transistor configured to apply a gate high voltage to a first output node in response to a charging voltage of the first control node, and a first pull-down transistor configured to apply a gate low voltage to the first output node in response to a charging voltage of the second control node; and a switch unit configured to change a current path between the first output node and a first power line to which a high potential voltage is applied or a second power line to which a first clock signal is applied according to a carry signal transmitted from a signal transmission unit of a previous stage and a voltage level of the second control node.

In another aspect, a display device comprises: a display panel on which a plurality of data lines to which a data voltage is applied, a plurality of gate lines crossing the data lines and to which a gate signal is applied, and pixel circuits connected to a plurality of power lines are disposed; a data driver configured to receive pixel data and output the data voltage; and a gate driver configured to output the gate signal using a shift register, wherein the gate driver includes a controller configured to charge and discharge a first control node that pulls up an output voltage and a second control node that pulls down the output voltage; a first output unit including a first pull-up transistor configured to apply a gate high voltage to a first output node in response to a charging voltage of the first control node, and a first pull-down transistor configured to apply a gate low voltage to the first output node in response to a charging voltage of the second control node; and a switch unit configured to change a current path between the first output node and a first power line to which a high potential voltage is applied or a second power line to which a first clock signal is applied according to a carry signal transmitted from a signal transmission unit of a previous stage and a voltage level of the second control node.

In the present disclosure, since a current path between an output node and a first power line to which a high potential voltage is applied or a second power line to which a clock signal is applied is changed according to a carry signal transmitted from a signal transmission unit of a previous stage and a voltage level of a second control node, a falling time of an output signal becomes fast and thus an output characteristic can be improved in an output section, and since the high potential voltage is applied to the output node while a first control node is maintained at a high voltage level, and the clock signal is applied to the output node while a second control node is maintained at the high voltage level, a floating section can be eliminated.

It is to be understood that both the foregoing general description and the following detailed description are exemplary and explanatory and are intended to provide further explanation of the inventive concepts as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain various principles. In the drawings.

DETAILED DESCRIPTION

Figure 1:
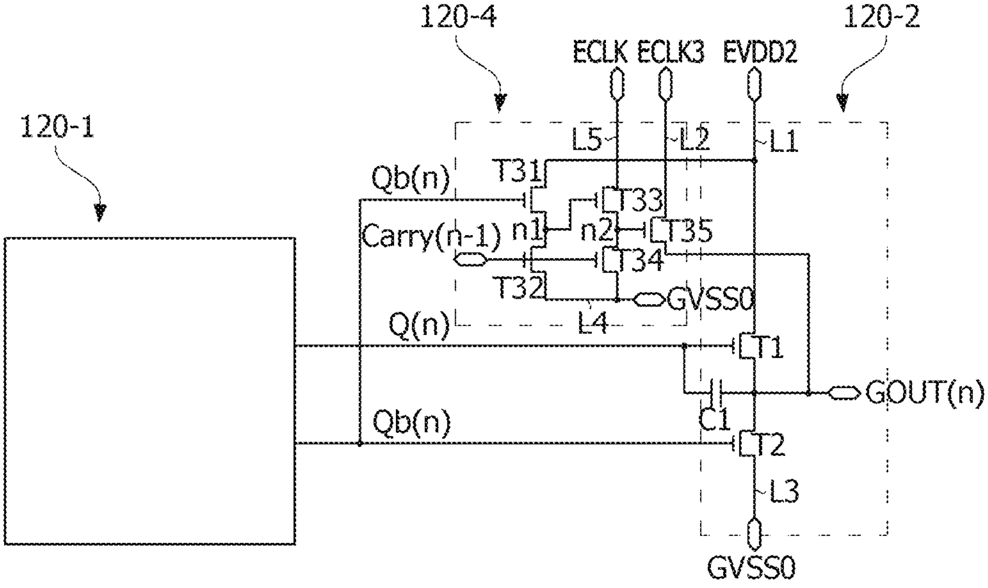
FIG. 1 is a view illustrating a gate driver according to a first embodiment of the present disclosure.

The advantages and features of the present disclosure and methods for accomplishing the same will be more clearly understood from embodiments described below with reference to the accompanying drawings. However, the present disclosure is not limited to the following embodiments but may be implemented in various different forms. Rather, the present embodiments will make the disclosure of the present disclosure complete and allow those skilled in the art to completely comprehend the scope of the present disclosure. The present disclosure is only defined within the scope of the accompanying claims.

The shapes, sizes, ratios, angles, numbers, and the like illustrated in the accompanying drawings for describing the embodiments of the present disclosure are merely examples, and the present disclosure is not limited thereto. Like reference numerals generally denote like elements throughout the present specification. Further, in describing the present disclosure, detailed descriptions of known related technologies may be omitted to avoid unnecessarily obscuring the subject matter of the present disclosure.

The terms such as "comprising," "including," and "having," used herein are generally intended to allow other components to be added unless the terms are used with the term "only." Any references to singular may include plural unless expressly stated otherwise.

Components are interpreted to include an ordinary error range even if not expressly stated.

When the position relation between two components is described using the terms such as "on," "above," "below," and "next," one or more components may be positioned between the two components unless the terms are used with the term "immediately" or "directly."

The terms "first," "second," and the like may be used to distinguish components from each other, but the functions or structures of the components are not limited by ordinal numbers or component names in front of the components.

The same reference numerals may refer to substantially the same elements throughout the present disclosure.

The following embodiments can be partially or entirely bonded to or combined with each other and can be linked and operated in technically various ways. The embodiments can be carried out independently of or in association with each other.

Hereinafter, various embodiments of the present disclosure will be described in detail with reference to the accompanying drawings.

FIG. 1 is a view illustrating a gate driver according to a first embodiment of the present disclosure.

Referring to FIG. 1, the gate driver according to the first embodiment of the present disclosure may include a first control node (hereinafter referred to as a "Q node Q(n)") that pulls up an output voltage, a second control node (hereinafter referred to as a "Qb node Qb(n)") that pulls down the output voltage, a controller 120-1, a first output unit 120-2, and a switch unit 120-4.

The controller 120-1 may serve to charge and discharge the first control node and the second control node.

The first output unit 120-2 may output a gate signal GOUT(n) in response to charging voltages of the first control node and the second control node. The first output unit 120-2 may include a first pull-up transistor T1 and a first pull-down transistor T2. The first pull-up transistor T1 may output a gate high voltage to an output node in response to the charging voltage of the first control node, and the first pull-down transistor T2 may output a gate low voltage to the output node in response to the charging voltage of the second control node. The first output unit 120-2 may further include a first capacitor C1 between a gate electrode of the first pull-up transistor T1 and the output node.

The switch unit 120-4 may connect a first power line L1 to which a high potential voltage EVDD2 is applied or a second power line L2 to which a first clock signal ECLK3 is applied to the first pull-up transistor using a carry signal transmitted from a signal transmission unit of a previous stage and the charging voltage of the second control node.

The switch unit 120-4 may include a third-1 transistor T31, a third-2 transistor T32, a third-3 transistor T33, a third-4 transistor T34, and a third-5 transistor T35.

The third-1 transistor T31 is turned on by the second control node to supply the high potential voltage EVDD2 to a first node n1. The third-1 transistor T31 includes a gate electrode connected to the second control node, a first electrode connected to the first power line L1 to which the high potential voltage EVDD2 is applied, and a second electrode connected to the first node n1.

The third-2 transistor T32 is turned on by a carry signal Carry(n−1) transmitted from the signal transmission unit of the previous stage to connect the first node n1 to a fourth power line L4 to which a low potential voltage GVSS0 is applied to discharge the first node n1. The third-2 transistor T32 includes a gate electrode to which the carry signal Carry(n−1) transmitted from the signal transmission unit of the previous stage is applied, a first electrode connected to the first node n1, and a second electrode connected to the fourth power line L4.

The third-3 transistor T33 is turned on by the first node n1 to connect a second node n2 to a fifth power line L5 to which a second clock signal ECLK is applied to supply the second clock signal ECLK. The third-3 transistor T33 includes a gate electrode connected to the first node n1, a first electrode connected to the fifth power line L5, and a second electrode connected to the second node n2.

The third-4 transistor T34 is turned on by the carry signal Carry(n−1) transmitted from the signal transmission unit of the previous stage to connect the second node n2 to the fourth power line L4 to which the low potential voltage GVSS0 is applied to discharge the second node n2. The third-4 transistor T34 includes a gate electrode to which the carry signal Carry(n−1) transmitted from the signal transmission unit of the previous stage is applied, a first electrode connected to the second node n2, and a second electrode connected to the fourth power line L4.

The third-5 transistor T35 is turned on by the second node n2 to supply a first clock signal ECLK3 to a first output node GOUT(n). The third-5 transistor T35 includes a gate electrode connected to the second node n2, a first electrode connected to the second power line L2 to which the first clock signal ECLK3 is applied, and a second electrode connected to the first output node GOUT(n).

Figure 2:
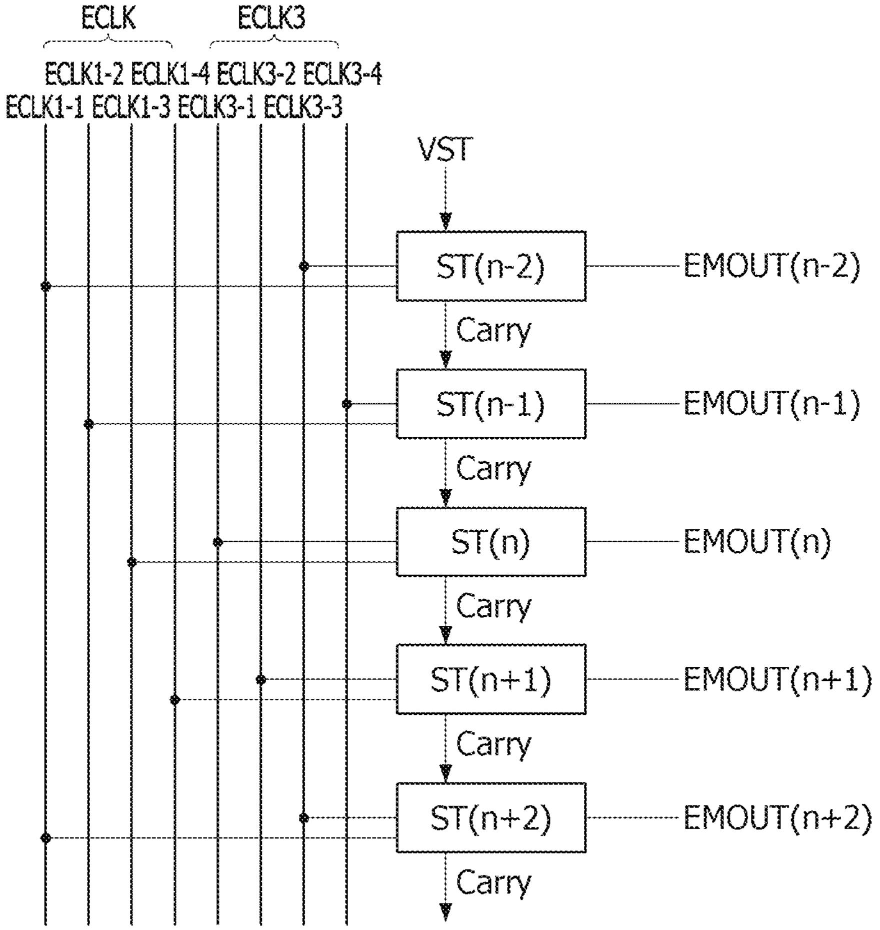
FIG. 2 is a view schematically illustrating the gate driver according to the embodiment of the present disclosure.

FIG. 2 is a view schematically illustrating the gate driver according to the embodiment of the present disclosure.

Referring to FIG. 2, the gate driver according to the embodiment includes a plurality of signal transmission units ST(n−2), ST(n−1), ST(n), ST(n+1), and ST(n+2) cascade-connected via a carry line through which a carry signal is transmitted.

Each of the signal transmission units ST(n−2), ST(n−1), ST(n), ST(n+1), and ST(n+2) receives a start pulse or a carry signal output from the signal transmission unit of the previous stage, and receives the clock signals ECLK (including ECLK1-1, ECLK1-2, ECLK1-3 and ECLK1-4) and ECLK3 (including ECLK3-1, ECLK3-2, ECLK3-3 and ECLK3-4). A first signal transmission unit ST(1) starts to be driven according to a start pulse VST, and each of the other signal transmission units ST(n−2), ST(n−1), ST(n), ST(n+1), and ST(n+2) receives the carry signal Carry output from the signal transmission unit of the previous stage and starts to be driven.

Each of the signal transmission units ST(n−2), ST(n−1), ST(n), ST(n+1), and ST(n+2) may charge the first control node using the second clock signal or an activation clock ECLK.

Each of the signal transmission units ST(n−2), ST(n−1), ST(n), ST(n+1), and ST(n+2) may generate an output signal EMOUT(n−2) to EMOUNT(n+2) using the first clock signal ECLK3. Here, the first clock signal ECLK3 may be an out-of-phase signal obtained by inverting a phase of the second clock signal ECLK.

Figure 3:
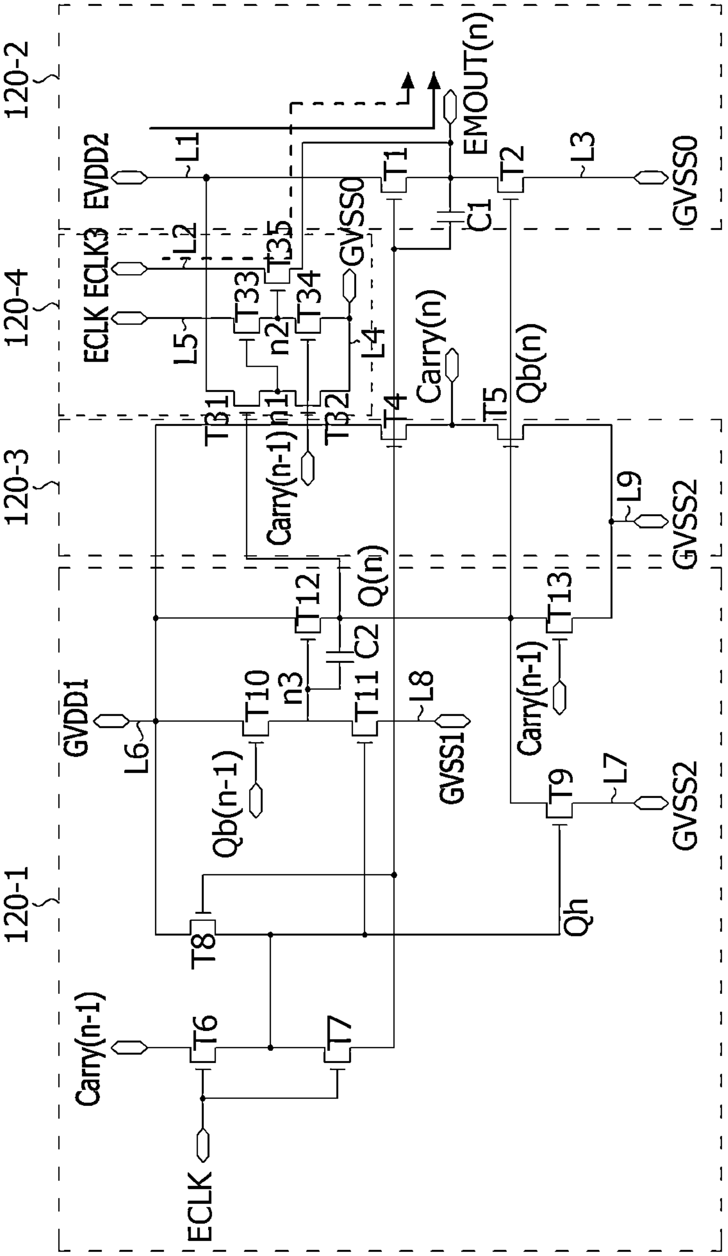
FIG. 3 is a detailed circuit diagram illustrating a gate driver according to a second embodiment of the present disclosure.
Figure 4:
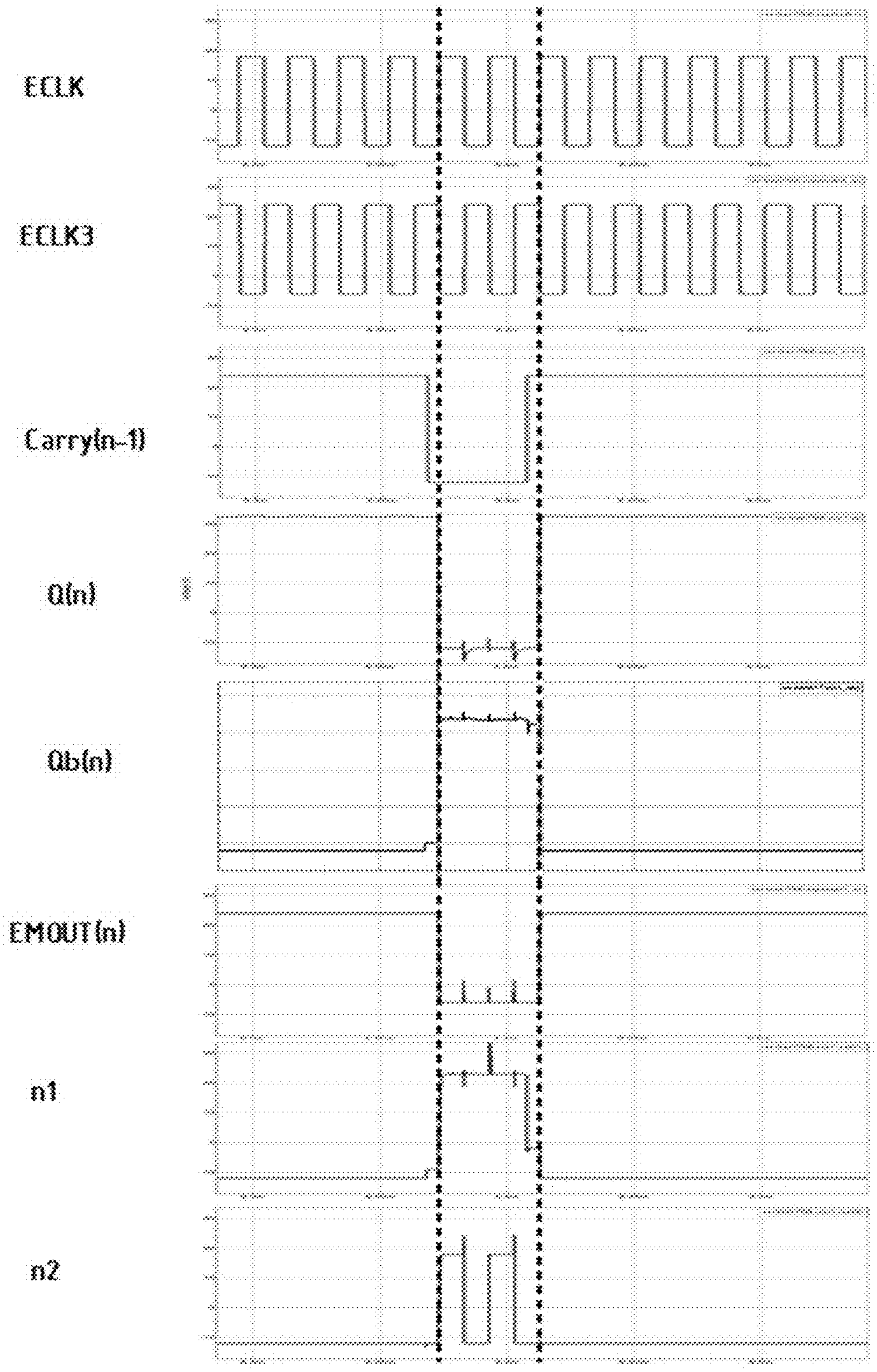
FIG. 4 is a waveform diagram illustrating voltages of input/output signals and control nodes of the gate driver shown in FIG. 3.

FIG. 3 is a detailed circuit diagram illustrating a gate driver according to a second embodiment of the present disclosure. Transistors constituting the gate driver may be implemented as n-channel oxide TFTs. The circuit shown in FIG. 3 is a circuit of an nth (n is a positive integer) signal transmission unit ST(n). Other signal transmission units may be implemented with substantially the same circuit as the nth signal transmission unit ST(n). FIG. 4 is a waveform diagram illustrating voltages of input/output signals and control nodes of the gate driver shown in FIG. 3.

Referring to FIGS. 3 and 4, the gate driver according to the second embodiment includes a first control node (hereinafter referred to as a "Q(n) node"), a second control node (hereinafter referred to as a "Qb(n) node"), a controller 120-1, a first output unit 120-2, a second output unit 120-3, and a switch unit 120-4.

The controller 120-1 may serve to charge and discharge the first control node and the second control node. The controller 120-1 includes a sixth transistor T6, a seventh transistor T7, an eighth transistor T8, a ninth transistor T9, a tenth transistor T10, an eleventh transistor T11, a twelfth transistor T12, and a thirteenth transistor T13.

The sixth transistor T6 is turned on to connect a carry signal node to a buffer node Qh when the activation clock ECLK is applied. The carry signal Carry(n−1) from the signal transmission unit of the previous stage is applied to the carry signal node. The carry signal Carry(n−1) may be output from a second output node of a previous signal transmission unit, for example, an n-lth signal transmission unit ST(n−1). The sixth transistor T6 includes a gate electrode to which the activation clock ECLK is applied, a first electrode connected to the carry signal node, and a second electrode connected to the buffer node Qh.

The seventh transistor T7 is turned on to connect the buffer node Qh to a first control node Q(n) when the activation clock ECLK is applied. The seventh transistor T7 includes a gate electrode to which the activation clock ECLK is applied, a first electrode connected to the buffer node Qh, and a second electrode connected to the first control node Q(n).

The sixth and seventh transistors T6 and T7 are turned on according to a high voltage of the activation clock ECLK during a time in which the activation clock ECLK is applied to charge the buffer node Qh and the first control node Q(n).

The eighth transistor T8 is turned on to connect a sixth power line L6 to the buffer node Qh to charge the buffer node Qh when the first control node Q(n) is charged to a high voltage. A high potential voltage GVDD1 is applied to the sixth power line L6. The eighth transistor T8 includes a gate electrode connected to the first control node Q(n), a first electrode connected to the sixth power line L6, and a second electrode connected to the buffer node Qh.

The ninth transistor T9 is turned on to connect a second control node Qb(n) to a seventh power line L7 to discharge the second control node Qb(n) when a voltage of the buffer node Qh is a high voltage VDD. A low potential voltage GVSS2 is applied to the seventh power line L7. The ninth transistor T9 includes a gate electrode connected to the buffer node Qh, a first electrode connected to the second control node Qb(n), and a second electrode connected to the seventh power line L7.

The tenth transistor T10 is turned on to connect the sixth power line L6 to a gate electrode of a twelfth transistor T12 when a voltage of the second control node Qb(n−1) of the signal transmission unit of the previous stage, that is, the n-lth signal transmission unit ST(n−1), is the high voltage VDD. The high potential voltage GVDD1 is applied to the sixth power line L6. The tenth transistor T10 includes a gate electrode connected to the second control node Qb(n−1) of the signal transmission unit of the previous stage, a first electrode connected to the sixth power line L6, and a second electrode connected to the gate electrode of the twelfth transistor T12 and a third node n3.

The eleventh transistor T11 is turned on to connect the gate electrode of the twelfth transistor T12 to an eighth power line L8 when the voltage of the buffer node Qh is the high voltage VDD. A low potential voltage GVSS1 is applied to the eighth power line L8. The eleventh transistor T11 includes a gate electrode connected to the buffer node Qh, a first electrode connected to the gate electrode of the twelfth transistor T12, and a second electrode connected to the eighth power line L8.

The twelfth transistor T12 is turned on to connect the sixth power line L6 to the second control node Qb(n) when the gate voltage is the high voltage VDD. A high potential voltage GVDD1 is applied to the sixth power line L6. The twelfth transistor T12 includes the gate electrode connected to the second electrode of the tenth transistor T10 and the first electrode of the eleventh transistor T11, a first electrode connected to the sixth power line L6, and a second electrode connected to the second control node Qb(n). A second capacitor C2 may be connected between the gate electrode and the second electrode of the twelfth transistor T12.

The thirteenth transistor T13 is turned on by the carry signal Carry(n−1) transmitted from the signal transmission unit of the previous stage to connect a ninth power line L9 to the second control node Qb(n). The thirteenth transistor T13 includes a gate electrode connected to the carry signal node, a first electrode connected to the second control node Qb(n), and a second electrode connected to the ninth power line L9.

The second output unit 120-3 outputs the carry signal Carry(n) by charging and discharging the second output node. The second output unit 120-3 includes a second pull-up transistor T4 and a second pull-down transistor T5.

The second pull-up transistor T4 includes a gate electrode connected to the first control node Q(n), a first electrode connected to the sixth power line L6, and a second electrode connected to the second output node.

The second pull-down transistor T5 is connected to the second pull-up transistor T4 with the second output node therebetween. The second pull-down transistor T5 includes a gate electrode connected to the second control node Qb(n), a first electrode connected to the second output node, and a second electrode connected to the ninth power line L9.

The first output unit 120-2 outputs an output signal EMOUT(n) by charging and discharging the first output node. The first output unit 120-2 includes a first pull-up transistor T1 driven by the first control node and a first pull-down transistor T2 driven by the second control node. The first pull-up transistor T1 outputs a gate high voltage to an output node in response to a charging voltage of the first control node. The first pull-up transistor T1 includes a gate electrode connected to the first control node, a first electrode connected to a first power line to which a high potential voltage EVDD2 is applied, and a second electrode connected to the first output node. The first pull-down transistor T2 may output a gate low voltage to the output node in response to a charging voltage of the second control node. The first pull-down transistor T2 includes a gate electrode connected to the second control node, a first electrode connected to the first output node, and a second electrode connected to a third power line L3 to which a low potential voltage GVSS0 is applied.

The gate driver according to the embodiment has a structure capable of selectively applying a CLK application method and a VDD application method by applying a pseudo inverter structure using the carry signal Carry(n−1) transmitted from the signal transmission unit of the previous stage and the charging voltage of the second control node Qb(n).

The gate driver according to the embodiment has a basic structure of the VDD application method, and has a structure in which an output characteristic is excellent and a floating section is eliminated by forming a current path to apply the clock signal to the output node in a section in which an output signal maintains a low level, and apply the high potential voltage to the output node in a section in which the output signal maintains a high level.

Figure 5:
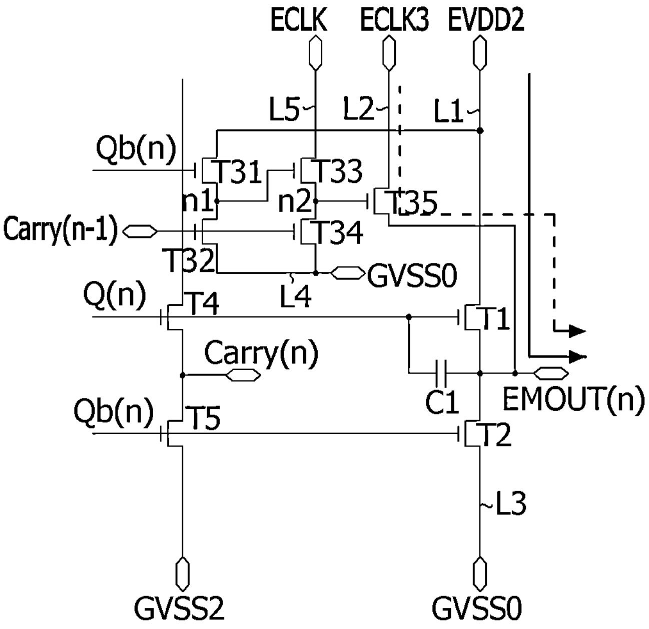
FIG. 5 is a view for describing an output state of a switch unit shown in FIG. 3.

FIG. 5 is a view for describing an output state of the switch unit shown in FIG. 3, and FIGS. 6A to 6C are views for describing a driving principle of the switch unit shown in FIG. 5.

Referring to FIG. 5, the switch unit 120-4 according to the embodiment of the present disclosure may connect the first power line L1 to which the high potential voltage EVDD2 is applied or the second power line L2 to which the first clock signal ECLK3 is applied to the first pull-up transistor using the carry signal Carry(n−1) transmitted from the signal transmission unit of the previous stage and the charging voltage of the second control node Qb(n).

For example, in a section in which the carry signal Carry(n−1) is at a high voltage level and the second control node Qb(n) is at a low voltage level, the first power line L1 may be connected to the first pull-up transistor T1, and in a section in which the carry signal Carry(n−1) is at a low voltage level and the second control node Qb(n) is at a high voltage level, the second power line L2 may be connected to the first pull-up transistor T1.

Figure 6A:
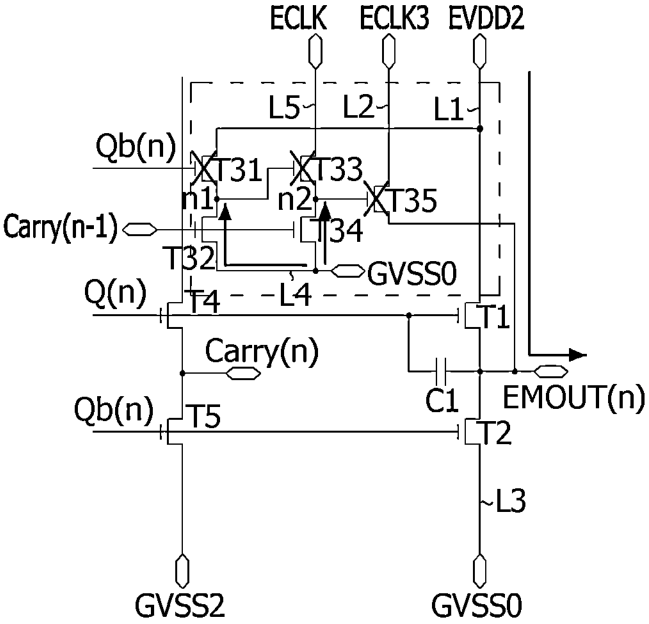
FIGS. 6A to 6C are views for describing a driving principle of the switch unit shown in FIG. 5.
Figure 6A:
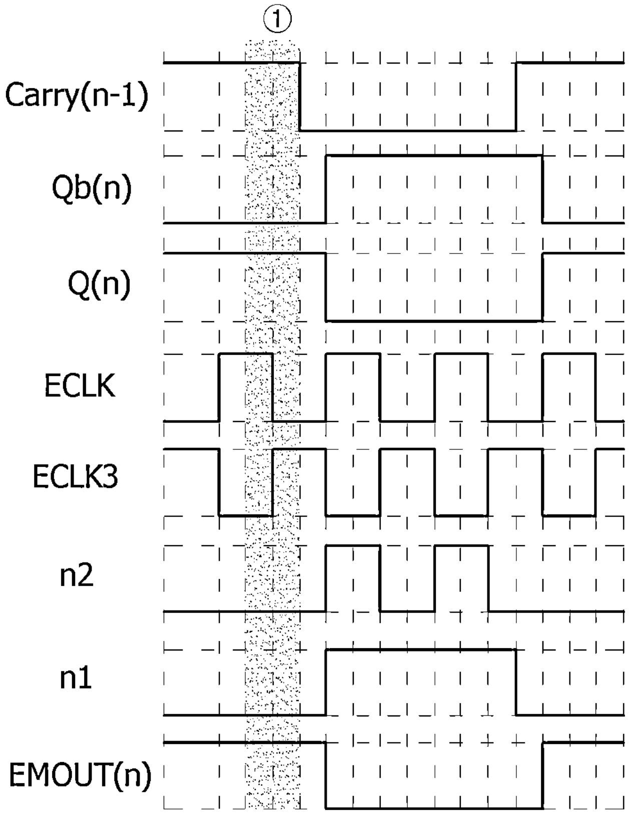

Referring to FIG. 6A, when the carry signal Carry(n−1) is at a high voltage level and the second control node Qb(n) is discharged and thus is at a low voltage level in a first section (①), since the third-1 transistor T31, the third-3 transistor T33, and the third-5 transistor T35 are turned off, the first node n1 and the second node n2 each maintain a low voltage level, and since the third-2 transistor T32 and the third-4 transistor T34 are turned on and thus the first power line L1 is connected to the first electrode of the first pull-up transistor T1, the high potential voltage EVDD2 is applied to the first output node.

Figure 6B:
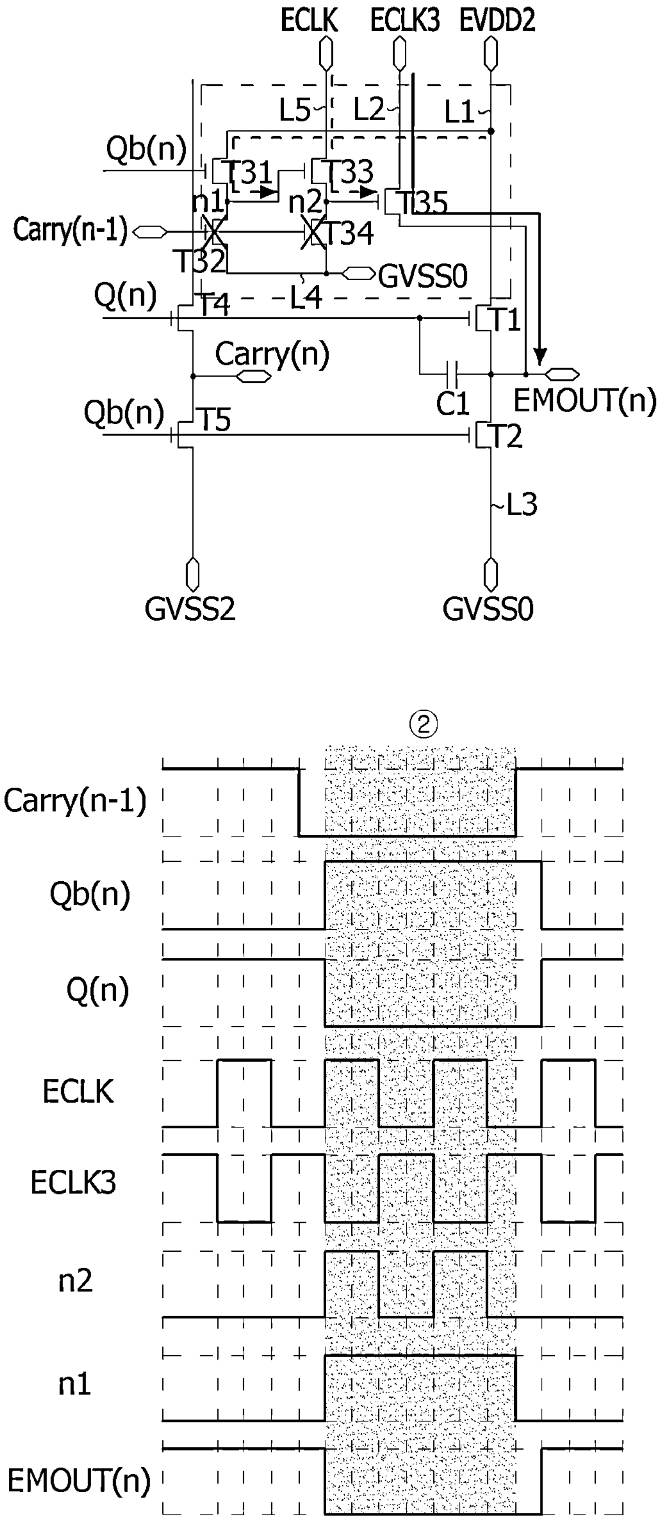

Referring to FIG. 6B, when the carry signal Carry(n−1) is at a low voltage level and the second control node Qb(n) is charged and thus is at a high voltage level in a second section (②), since the third-2 transistor T32 and the third-4 transistor T34 are turned off, and the third-1 transistor T31, the third-3 transistor T33, and the third-5 transistor T35 are turned on, the first node n1 maintains the high voltage level, and the second clock signal ECLK is applied to the second node n2.

When the second clock signal ECLK is at a high voltage level, the third-3 transistor T33 is turned on, and a low voltage of the first clock signal ECLK3 is applied to the first output node. When the second clock signal ECLK is at a low voltage level, the third-3 transistor T33 is turned off, and a high voltage of the first clock signal ECLK3 is not applied to the first output node.

Figure 6C:
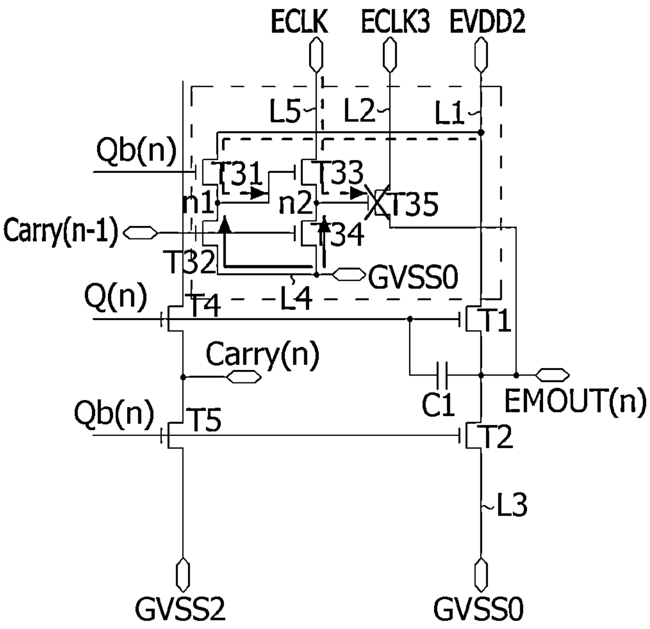
Figure 6C:
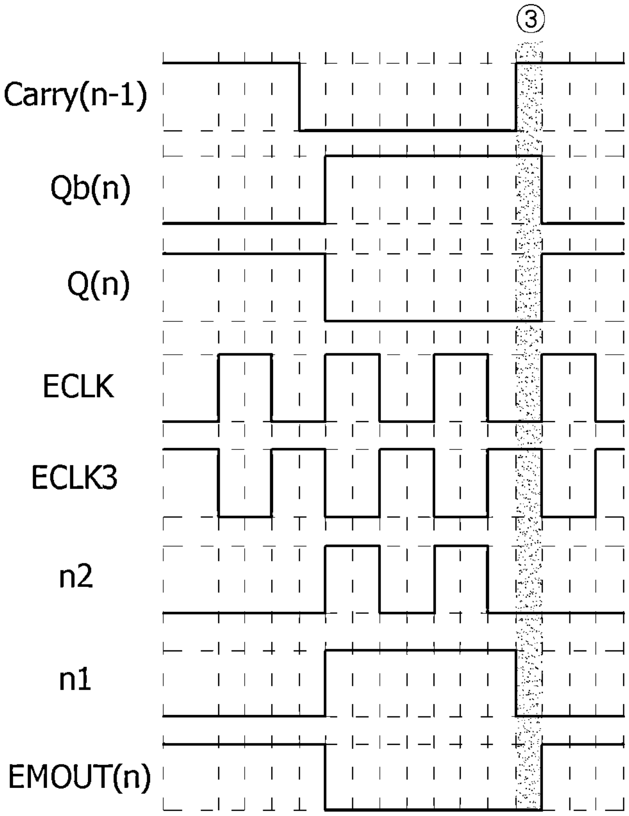

Referring to FIG. 6C, when the carry signal Carry(n−1) is at the high voltage level and the second control node Qb(n) is charged and thus is at the high voltage level in a third section (③), since the third-1 transistor T31, the third-2 transistor T32, the third-3 transistor T33, and the third-4 transistor T34 are turned on, the first node n1 and the second node n2 each maintain the low voltage level according to a width ratio of the transistor, and since the third-5 transistor T35 is turned off and thus the first output node is not connected to the first power line L1 or the second power line L2, the low voltage level in the second section (②) is maintained.

Figure 7A:
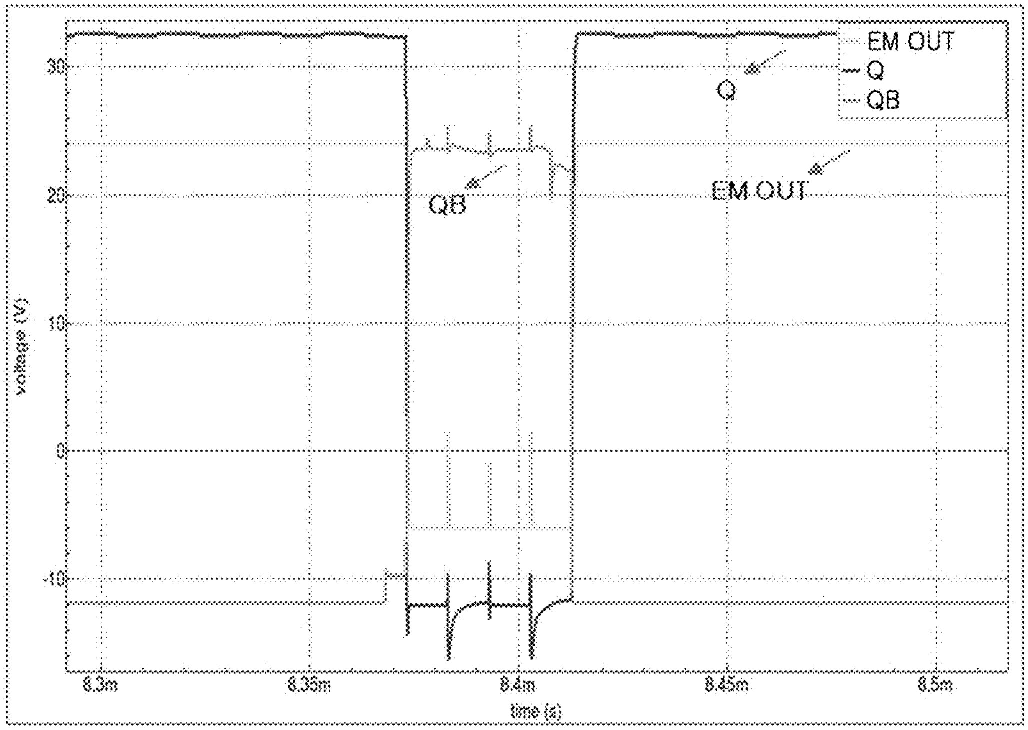
FIGS. 7A and 7B are views illustrating a simulation result using the gate driver shown in FIG. 3.
Figure 7B:
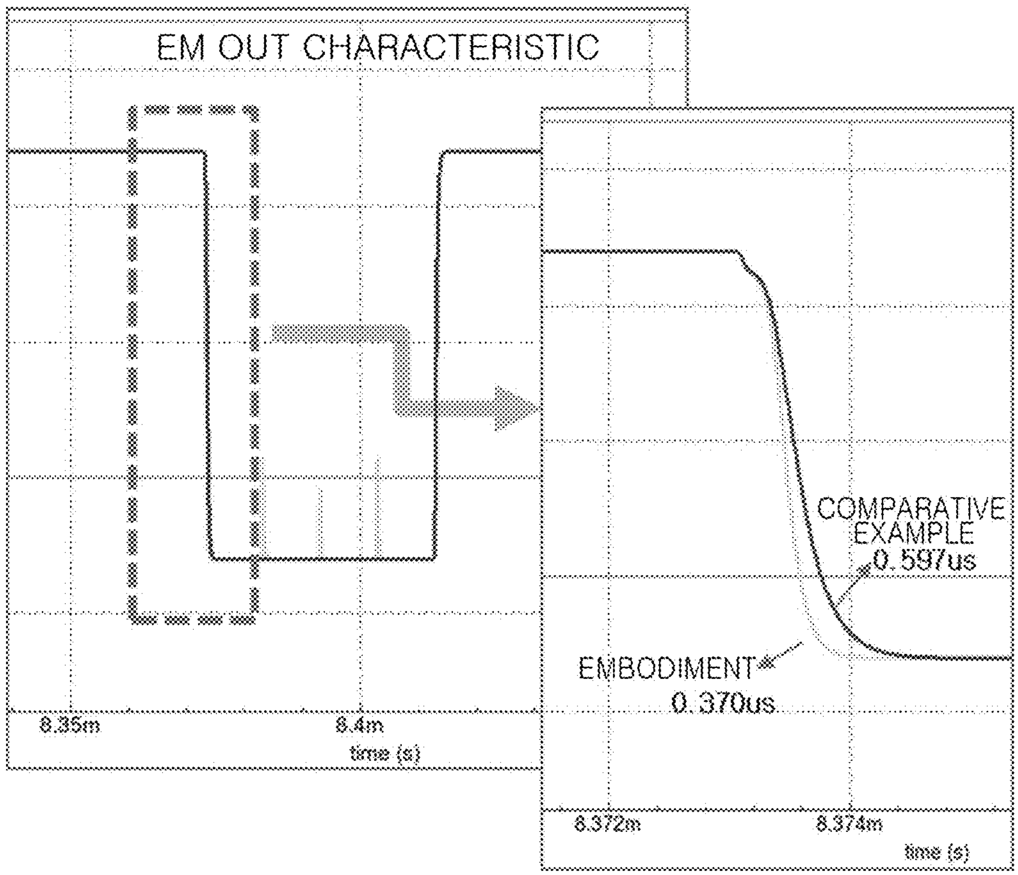

FIGS. 7A and 7B are views illustrating a simulation result using the gate driver shown in FIG. 3.

Referring to FIGS. 7A and 7B, according to the simulation result using the gate driver according to the embodiment of the present disclosure, it can be seen that the output signal is normally output. Further, in the gate driver according to the embodiment, it can be seen that a falling time of the output signal is improved to 0.370 ρs, which is a falling time that is improved 38% compared to 0.597 ρs of a gate driver according to a comparative example.

Figure 8:
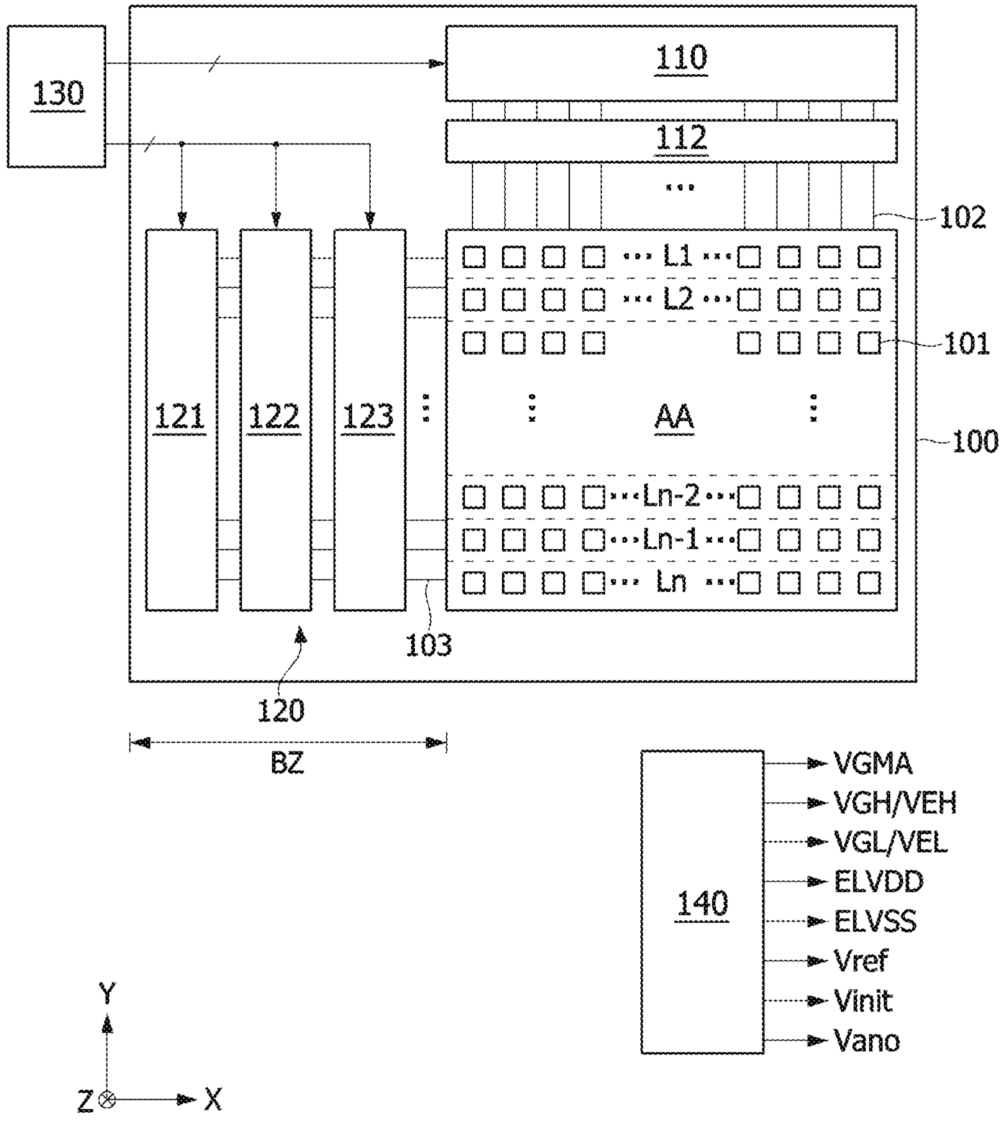
FIG. 8 is a block diagram illustrating a display device according to an embodiment of the present disclosure.
Figure 9:
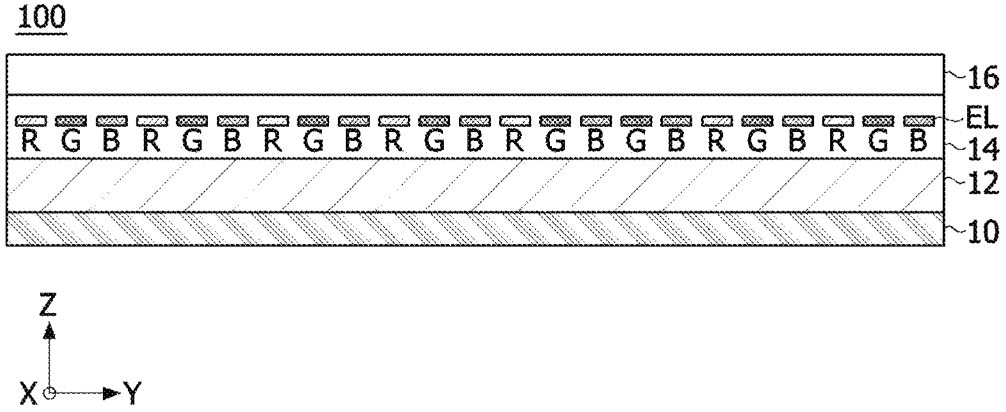
FIG. 9 is a view illustrating a cross-sectional structure of a display panel shown in FIG. 8.

FIG. 8 is a block diagram illustrating a display device according to an embodiment of the present disclosure, and FIG. 9 is a diagram illustrating a cross-sectional structure of the display panel shown in FIG. 8.

Referring to FIG. 8, the display device according to an embodiment of the present disclosure includes a display panel 100, a display panel driving circuit for writing pixel data to pixels of the display panel 100, and a power supply 140 for generating power necessary for driving the pixels and the display panel driving circuit.

The display panel 100 includes a pixel array AA that displays an input image. The pixel array AA includes a plurality of data lines 102, a plurality of gate lines 103 intersected with the data lines 102, and pixels arranged in a matrix form.

The pixel array AA includes a plurality of pixel lines L1 to Ln. Each of the pixel lines L1 to Ln includes one line of pixels arranged along a line direction X in the pixel array AA of the display panel 100. Pixels arranged in one pixel line share the gate lines 103. Pixels arranged in a column direction Y along a data line direction share the same data line 102. One horizontal period 1H is a time obtained by dividing one frame period by the total number of pixel lines L1 to Ln.

Touch sensors may be disposed on the display panel 100. A touch input may be sensed using separate touch sensors or may be sensed through pixels. The touch sensors may be disposed as an on-cell type or an add-on type on the screen of the display panel or implemented as in-cell type touch sensors embedded in the pixel array AA.

The display panel 100 may be implemented as a flexible display panel. The flexible display panel may be made of a plastic OLED panel. An organic thin film may be disposed on a back plate of the plastic OLED panel, and the pixel array AA may be formed on the organic thin film.

The back plate of the plastic OLED may be a polyethylene terephthalate (PET) substrate. The organic thin film is formed on the back plate. The pixel array AA and a touch sensor array may be formed on the organic thin film. The back plate blocks moisture permeation so that the pixel array AA is not exposed to humidity. The organic thin film may be a thin Polyimide (PI) film substrate. A multi-layered buffer film may be formed of an insulating material (not shown) on the organic thin film. Lines may be formed on the organic thin film so as to supply power or signals applied to the pixel array AA and the touch sensor array.

To implement color, each of the pixels may be divided into a red sub-pixel (hereinafter referred to as "R sub-pixel"), a green sub-pixel (hereinafter referred to as "G sub-pixel"), and a blue sub-pixel (hereinafter referred to as "B sub-pixel"). Each of the pixels may further include a white sub-pixel. Each of the sub-pixels 101 includes a pixel circuit. The pixel circuit is connected to the data line 102 and the gate line 103.

Hereinafter, a pixel may be interpreted as having the same meaning as a sub-pixel.

As shown in FIG. 9, when viewed from a cross-sectional structure, the display panel 100 may include a circuit layer 12, a light emitting element layer 14, and an encapsulation layer 16 stacked on a substrate 10.

The circuit layer 12 may include a pixel circuit connected to wirings such as a data line, a gate line, and a power line, a gate driver (GIP) connected to the gate lines, a demultiplexer array 112, a circuit (not shown) for auto probe inspection, and the like. The wirings and circuit elements of the circuit layer 12 may include a plurality of insulating layers, two or more metal layers separated with the insulating layer therebetween, and an active layer including a semiconductor material. All transistors formed in the circuit layer 12 may be implemented as oxide TFTs having an n-channel type oxide semiconductor.

The light emitting element layer 14 may include a light emitting element EL driven by a pixel circuit. The light emitting element EL may include a red (R) light emitting element, a green (G) light emitting element, and a blue (B) light emitting element. The light emitting element layer 14 may include a white light emitting element and a color filter. The light emitting elements EL of the light emitting element layer 14 may be covered by a protective layer including an organic film and a passivation film.

The encapsulation layer 16 covers the light emitting element layer 14 to seal the circuit layer 12 and the light emitting element layer 14. The encapsulation layer 16 may have a multilayered insulating structure in which an organic film and an inorganic film are alternately stacked. The inorganic film blocks the penetration of moisture and oxygen. The organic film planarizes the surface of the inorganic film. When the organic film and the inorganic film are stacked in multiple layers, a movement path of moisture or oxygen becomes longer compared to a single layer, so that penetration of moisture and oxygen affecting the light emitting element layer 14 can be effectively blocked.

A touch sensor layer may be disposed on the encapsulation layer 16. The touch sensor layer may include capacitive type touch sensors that sense a touch input based on a change in capacitance before and after the touch input. The touch sensor layer may include metal wiring patterns and insulating layers forming the capacitance of the touch sensors. The capacitance of the touch sensor may be formed between the metal wiring patterns. A polarizing plate may be disposed on the touch sensor layer. The polarizing plate may improve visibility and contrast ratio by converting the polarization of external light reflected by metal of the touch sensor layer and the circuit layer 12. The polarizing plate may be implemented as a polarizing plate in which a linear polarizing plate and a phase delay film are bonded, or a circular polarizing plate. A cover glass may be adhered to the polarizing plate.

The display panel 100 may further include a touch sensor layer and a color filter layer stacked on the encapsulation layer 16. The color filter layer may include red, green, and blue color filters and a black matrix pattern. The color filter layer may replace the polarizing plate and increase the color purity by absorbing a part of the wavelength of light reflected from the circuit layer and the touch sensor layer. In this embodiment, by applying the color filter layer 20 having a higher light transmittance than the polarizing plate to the display panel, the light transmittance of the display panel 100 can be improved, and the thickness and flexibility of the display panel 100 can be improved. A cover glass may be adhered on the color filter layer.

The power supply 140 generates DC power required for driving the pixel array AA and the display panel driving circuit of the display panel 100 by using a DC-DC converter. The DC-DC converter may include a charge pump, a regulator, a buck converter, a boost converter, and the like. The power supply 140 may adjust a DC input voltage from a host system (not shown) and thereby generate DC voltages such as a gamma reference voltage VGMA, gate-on voltages VGH and VEH, gate-off voltages VGL and VEL, a pixel driving voltage ELVDD, a pixel low-potential power supply voltage ELVSS, a reference voltage Vref, an initialization voltage Vinit and an anode voltage Vano. The gamma reference voltage VGMA is supplied to a data driver 110. The gate-on voltages VGH and VEH and the gate-off voltages VGL and VEL are supplied to a gate driver 120. The pixel driving voltage ELVDD, the pixel low-potential power supply voltage ELVSS, the reference voltage Vref, the initialization voltage Vinit and the anode voltage Vano are commonly supplied to the pixels.

The display panel driving circuit writes pixel data (digital data) of an input image to the pixels of the display panel 100 under the control of a timing controller (TCON) 130.

The display panel driving circuit includes the data driver 110 and the gate driver 120.

A de-multiplexer (DEMUX) array 112 may be disposed between the data driver 110 and the data lines 102. The de-multiplexer array 112 sequentially connects one channel of the data driver 110 to the plurality of data lines 102 and distributes in a time division manner the data voltage outputted from one channel of the data driver 110 to the data lines 102, thereby reducing the number of channels of the data driver 110. The de-multiplexer array 112 may be omitted. In this case, output buffers (AMP) of the data driver 110 are directly connected to the data lines 102.

The display panel driving circuit may further include a touch sensor driver for driving the touch sensors. The touch sensor driver is omitted from FIG. 8. In a mobile device, the timing controller 130, the power supply 140, the data driver 110, and the like may be integrated into one drive integrated circuit (IC).

The data driver 110 generates a data voltage Vdata by converting pixel data of an input image received from the timing controller 130 with a gamma compensation voltage every frame period by using a digital to analog converter (DAC). The gamma reference voltage VGMA is divided for respective gray scales through a voltage divider circuit. The gamma compensation voltage divided from the gamma reference voltage VGMA is provided to the DAC of the data driver 110. The data voltage Vdata is outputted through the output buffer (AMP) in each of the channels of the data driver 110.

In the data driver 110, the output buffer (AMP) included in one channel may be connected to adjacent data lines 102 through the de-multiplexer array 112. The de-multiplexer array 112 may be formed directly on the substrate of the display panel 100 or integrated into one drive IC together with the data driver 110.

The gate driver 120 may be implemented as a gate in panel (GIP) circuit formed directly on a bezel area BZ of the display panel 100 together with the TFT array of the pixel array AA. The gate driver 120 sequentially outputs gate signals to the gate lines 103 under the control of the timing controller 130. The gate driver 120 may sequentially supply the gate signals to the gate lines 103 by shifting the gate signals using a shift register.

The gate signal may include a scan signal for selecting pixels of a line in which data is to be written in synchronization with the data voltage, and an EM signal defining an emission time of pixels charged with the data voltage.

The gate driver 120 may include a scan driver 121, an EM driver 122, and an initialization driver 123.

The scan driver 121 outputs a scan signal Scan in response to a start pulse and a shift clock from the timing controller 130, and shifts the scan signal Scan according to the shift clock timing. The EM driver 122 outputs an EM signal EM in response to a start pulse and a shift clock from the timing controller 130, and sequentially shifts the EM signal EM according to the shift clock timing. The initialization driver 123 outputs an initialization signal Vinit in response to a start pulse and a shift clock from the timing controller 130, and shifts the initialization signal Vinit according to the shift clock timing. Therefore, the scan signal Scan, the EM signal EM, and the initialization signal Vinit are sequentially supplied to the gate lines 103 of the pixel lines L1 to Ln. In case of a bezel-free model, at least some of transistors constituting the gate driver 120 and clock wirings may be dispersedly disposed in the pixel array AA.

The timing controller 130 receives, from a host system (not shown), digital video data DATA of an input image and a timing signal synchronized therewith. The timing signal includes a vertical synchronization signal Vsync, a horizontal synchronization signal Hsync, a main clock CLK, a data enable signal DE, and the like. Because a vertical period and a horizontal period can be known by counting the data enable signal DE, the vertical synchronization signal Vsync and the horizontal synchronization signal Hsync may be omitted. The data enable signal DE has a cycle of one horizontal period (1H).

The host system may be any one of a television (TV) system, a set-top box, a navigation system, a personal computer (PC), a home theater system, a vehicle system, and a mobile device system.

The timing controller 130 multiplies an input frame frequency by i and controls the operation timing of the display panel driving circuit with a frame frequency of the input frame frequency×i (i is a positive integer greater than 0) Hz. The input frame frequency is 60 Hz in the NTSC (National Television Standards Committee) scheme and 50 Hz in the PAL (Phase-Alternating Line) scheme.

Based on the timing signals Vsync, Hsync, and DE received from the host system, the timing controller 130 generates a data timing control signal for controlling the operation timing of the data driver 110, MUX signals MUX1 and MUX2 for controlling the operation timing of the de-multiplexer array 112, and a gate timing control signal for controlling the operation timing of the gate driver 120.

The voltage level of the gate timing control signal outputted from the timing controller 130 may be converted into the gate-on voltages VGH and VEH and the gate-off voltages VGL and VEL through a level shifter (not shown) and then supplied to the gate driver 120. That is, the level shifter converts a low level voltage of the gate timing control signal into the gate-off voltages VGL and VEL and converts a high level voltage of the gate timing control signal into the gate-on voltages VGH and VEH. The gate timing control signal includes the start pulse and the shift clock.

Figure 10:
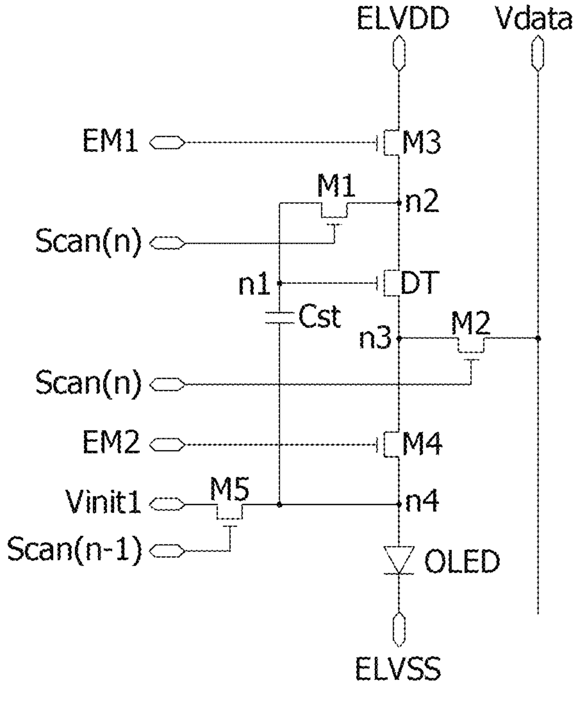
FIG. 10 is a view illustrating a pixel circuit applied to the display panel shown in FIG. 8.
Figure 11:
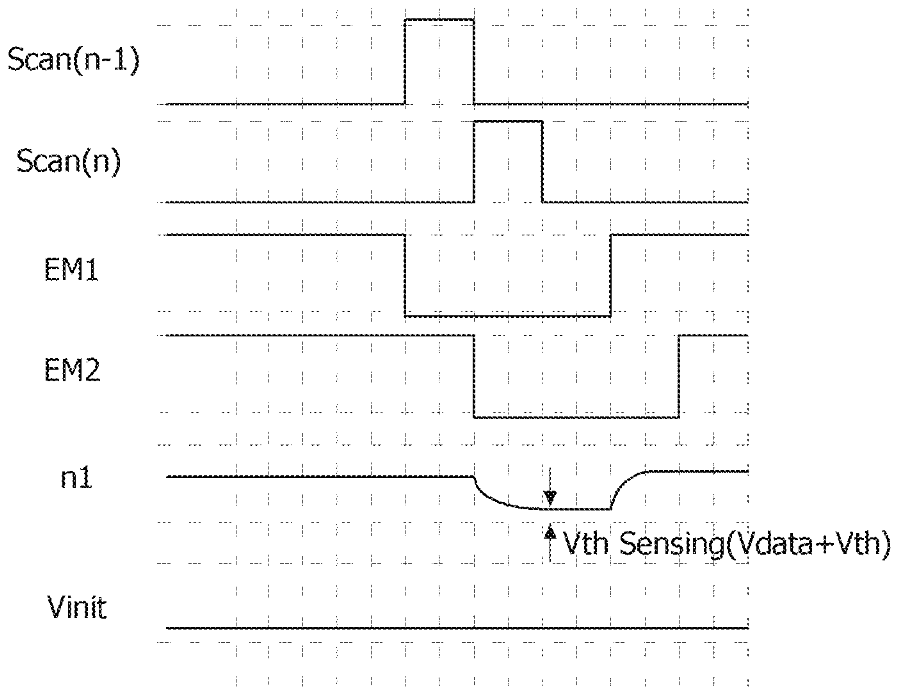
FIG. 11 is a waveform diagram illustrating a driving signal of the pixel circuit shown in FIG. 10.

FIG. 10 is a view illustrating a pixel circuit applied to a display panel shown in FIG. 8, and FIG. 11 is a waveform diagram illustrating a driving signal of the pixel circuit shown in FIG. 10.

Referring to FIGS. 10 and 11, the pixel circuit according to the embodiment of the present disclosure includes a light-emitting element OLED, a driving element DT that drives the light-emitting element OLED, a plurality of switch elements M1, M2, M3, M4, and M5 that switch a current path connected to the driving element DT, and a capacitor Cst that stores a gate-source voltage Vgs of the driving element DT. The driving element DT and the plurality of switch elements M1, M2, M3, M4, and M5 may be implemented as n-channel transistors.

The light emitting element EL emits light by a current applied through a channel of the driving element DT according to a gate-source voltage Vgs of the driving element DT that varies according to a data voltage Vdata. The light emitting element EL may be implemented as an OLED including an organic compound layer formed between an anode and a cathode. The organic compound layer may include, but is not limited to, a hole injection layer (HIL), a hole transport layer (HTL), a light emitting layer (EML), an electron transport layer (ETL), and an electron injection layer (EIL). The anode of the light emitting element EL is connected to the driving element DT through a fourth node n4, and the cathode of the light emitting element EL is connected to a power line to which a low-potential power voltage ELVSS is applied.

An organic light emitting diode used as the light emitting element may have a tandem structure in which a plurality of light emitting layers are stacked. The organic light emitting diode having the tandem structure may improve the luminance and lifespan of the pixel.

A first switch element M1 is turned on according to a gate-on voltage VGH of a second scan signal Scan(n) to connect a first node n1 and a second node n2. The first switch element M1 includes a gate electrode to which the second scan signal Scan(n) is applied, a first electrode connected to the first node n1, and a second electrode connected to the second node n2.

A second switch element M2 is turned on according to the gate-on voltage VGH of the second scan signal Scan(n) to supply a data voltage Vdata to a third node n3. The second switch element M2 includes a gate electrode to which the second scan signal Scan(n) is applied, a first electrode connected to the third node n3, and a second electrode to which the data voltage Vdata is applied.

A third switch element M3 is turned on according to a gate-on voltage VGH of a first EM pulse EM1 to form a current path between a pixel driving voltage ELVDD and the driving element DT. The third switch element M3 includes a gate electrode to which the first EM pulse EM1 is applied, a first electrode to which the pixel driving voltage ELVDD is applied, and a second electrode connected to the second node n2.

A fourth switch element M4 is turned on according to a gate-on voltage VGH of a second EM pulse EM2 to form a current path between the driving element DT and the light-emitting element OLED. The fourth switch element M4 includes a gate electrode to which the second EM pulse EM2 is applied, a first electrode connected to the third node n3, and a second electrode connected to the fourth node n4.

A fifth switch element M5 is turned on according to a gate-on voltage VGH of a first scan signal Scan(n−1) to supply an initialization voltage Vinit1 to a fourth node n4. The fifth switch element M5 includes a gate electrode to which the first scan signal Scan(n−1) is applied, a first electrode to which the initialization voltage Vinit1 is applied, and a second electrode connected to the fourth node n4.

The capacitor Cst is connected between the first node n1 and the fourth node n4. In sensing operation, the threshold voltage Vth of the driving element DT is sensed and stored in the capacitor Cst.

The first EM pulse EM1 and the second EM pulse EM2 have the same pulse width, and the first EM pulse EM1 is a pulse having a phase leading a phase of the second EM pulse EM2. The first EM pulse EM1 and the second EM pulse EM2 are generated by the gate driver shown in FIG. 1 and the gate driver shown in FIG. 3.

Here, an internal compensation circuit of an n-channel metal oxide semiconductor (NMOS) is described as an example, but the present disclosure is not necessarily limited thereto, and all circuits that require the EM pulses of the gate driver according to the embodiment are applicable.

It will be apparent to those skilled in the art that various modifications and variations can be made in the gate driver and the display device including the same of the present disclosure without departing from the technical idea or scope of the disclosure. Thus, it is intended that the present disclosure cover the modifications and variations of this disclosure provided they come within the scope of the appended claims and their equivalents.

What is claimed is:

1. Agate driver, comprising:

a controller configured to charge and discharge a first control node that pulls up an output voltage and a second control node that pulls down the output voltage;

a first output unit including a first pull-up transistor configured to apply a gate high voltage to a first output node in response to a charging voltage of the first control node, and a first pull-down transistor configured to apply a gate low voltage to the first output node in response to a charging voltage of the second control node; and a switch unit configured to change a current path between the first output node and a first power line to which a high potential voltage is applied or a second power line to which a first clock signal is applied according to a carry signal transmitted from a signal transmission unit of a previous stage and a voltage level of the second control node.

2. The gate driver of claim 1, wherein the first pull-up transistor includes a gate electrode connected to the first control node, a first electrode connected to the first power line, and a second electrode connected to the first output node, and the first pull-down transistor includes a gate electrode connected to the second control node, a first electrode connected to the first output node, and a second electrode connected to a third power line.

3. The gate driver of claim 2, wherein the switch unit includes:

a first transistor having a gate electrode connected to the second control node, a first electrode connected to the first power line, and a second electrode connected to a first node;

a second transistor having a gate electrode to which the carry signal is applied from the signal transmission unit of the previous stage, a first electrode connected to the first node, and a second electrode connected to a fourth power line to which a low potential voltage is applied;

a third transistor having a gate electrode connected to the first node, a first electrode connected to a fifth power line to which a second clock signal is applied, and a second electrode connected to a second node;

a fourth transistor having a gate electrode to which the carry signal is applied from the signal transmission unit of the previous stage, a first electrode connected to the second node, and a second electrode connected to the fourth power line; and a fifth transistor having a gate electrode connected to the second node, a first electrode connected to the second power line, and a second electrode connected to the first output node.

4. The gate driver of claim 3, wherein the second clock signal is an out-of-phase signal of the first clock signal.

5. The gate driver of claim 3, wherein the current path is formed between the first output node and the first power line when the carry signal transmitted from the signal transmission unit of the previous stage is at a high voltage level, and a current path is formed between the first output node and the second power line when the carry signal transmitted from the signal transmission unit of the previous stage is at a low voltage level.

6. The gate driver of claim 5, wherein the first transistor, the third transistor, and the fifth transistor are turned off, the second transistor and the fourth transistor are turned on, and the current path is formed between the first output node and the first power line when the carry signal transmitted from the signal transmission unit of the previous stage is at the high voltage level and the second control node is discharged.

7. The gate driver of claim 5, wherein the first transistor, the third transistor, and the fifth transistor are turned on, the second transistor and the fourth transistor are turned off, and the current path is formed between the first output node and the second power line when the carry signal transmitted from the signal transmission unit of the previous stage is at the low voltage level and the second control node is charged.

8. The gate driver of claim 5, wherein the first transistor, the second transistor, the third transistor, and the fourth transistor are turned on, the fifth transistor is turned off, and the current paths are not formed between the first output node and the first and second power lines when the carry signal transmitted from the signal transmission unit of the previous stage is at the high voltage level and the second control node is charged.

9. The gate driver of claim 3, wherein the controller includes a sixth transistor, a seventh transistor, an eighth transistor, a ninth transistor, a tenth transistor, an eleventh transistor, a twelfth transistor, and a thirteenth transistor, wherein the sixth transistor includes a gate electrode to which an activation clock is input, a first electrode to which the carry signal is input from the signal transmission unit of the previous stage, and a second electrode connected to a buffer node, the seventh transistor includes a gate electrode to which the activation clock is input, a first electrode connected to the buffer node, and a second electrode connected to the first control node, the eighth transistor includes a gate electrode connected to the first control node, a first electrode connected to a sixth power line to which the high potential voltage is applied, and a second electrode connected to the buffer node, the ninth transistor includes a gate electrode connected to the buffer node, a first electrode connected to the second control node, and a second electrode connected to a seventh power line to which the low potential voltage is applied, the tenth transistor includes a gate electrode to which the second control node of the signal transmission unit of the previous stage is connected, a first electrode connected to the sixth power line, and a second electrode connected to a third node, the eleventh transistor includes a gate electrode connected to the buffer node, a first electrode connected to the third node, and a second electrode connected to an eighth power line to which the low potential voltage is applied, the twelfth transistor includes a gate electrode connected to the third node, a first electrode connected to the sixth power line, and a second electrode connected to the second control node, and the thirteenth transistor includes a gate electrode to which the carry signal is applied from the signal transmission unit of the previous stage, a first electrode connected to the second control node, and a second electrode connected to a ninth power line to which the low potential voltage is applied.

10. The gate driver of claim 9, further comprising a second output unit configured to output a carry signal to a second output node according to the charging voltages of the first control node and the second control node, wherein the second output unit includes:

a second pull-up transistor driven according to a voltage of the first control node; and a second pull-down transistor driven according to the voltage of the second control node and connected to the second pull-up transistor with the second output node from which the carry signal is output therebetween.

11. The gate driver of claim 10, wherein the second pull-up transistor includes a gate electrode connected to the first control node, a first electrode connected to the sixth power line, and a second electrode connected to the second output node, and the second pull-down transistor includes a gate electrode connected to the second control node, a first electrode connected to the second output node, and a second electrode connected to the ninth power line.

12. The gate driver of claim 9, wherein the controller further includes a second capacitor connected between the gate electrode of the twelfth transistor and the second electrode of twelfth transistor.

13. The gate driver of claim 2, wherein the first output unit further includes a first capacitor connected between the gate electrode of the first pull-up transistor and the first output node.

14. A display device, comprising:

a display panel on which a plurality of data lines to which a data voltage is applied, a plurality of gate lines crossing the data lines and to which a gate signal is applied, and pixel circuits connected to a plurality of power lines are disposed;

a data driver configured to receive pixel data and output the data voltage; and a gate driver configured to output the gate signal using a shift register, wherein the gate driver includes:

a controller configured to charge and discharge a first control node that pulls up an output voltage and a second control node that pulls down the output voltage;

a first output unit including a first pull-up transistor configured to apply a gate high voltage to a first output node in response to a charging voltage of the first control node, and a first pull-down transistor configured to apply a gate low voltage to the first output node in response to a charging voltage of the second control node; and a switch unit configured to change a current path between the first output node and a first power line to which a high potential voltage is applied or a second power line to which a first clock signal is applied according to a carry signal transmitted from a signal transmission unit of a previous stage and a voltage level of the second control node.

15. The display device of claim 14, wherein the first pull-up transistor includes a gate electrode connected to the first control node, a first electrode connected to the first power line, and a second electrode connected to the first output node, and the first pull-down transistor includes a gate electrode connected to the second control node, a first electrode connected to the first output node, and a second electrode connected to a third power line.

16. The display device of claim 15, wherein the switch unit includes:

a first transistor having a gate electrode connected to the second control node, a first electrode connected to the first power line, and a second electrode connected to a first node;

a second transistor having a gate electrode to which the carry signal is applied from the signal transmission unit of the previous stage, a first electrode connected to the first node, and a second electrode connected to a fourth power line to which a low potential voltage is applied;

a third transistor having a gate electrode connected to the first node, a first electrode connected to a fifth power line to which a second clock signal is applied, and a second electrode connected to a second node;

a fourth transistor having a gate electrode to which the carry signal is applied from the signal transmission unit of the previous stage, a first electrode connected to the second node, and a second electrode connected to the fourth power line; and a fifth transistor having a gate electrode connected to the second node, a first electrode connected to the second power line, and a second electrode connected to the first output node.

17. The display device of claim 16, wherein the current path is formed between the first output node and the first power line when the carry signal transmitted from the signal transmission unit of the previous stage is at a high voltage level, and a current path is formed between the first output node and the second power line when the carry signal transmitted from the signal transmission unit of the previous stage is at a low voltage level.

18. The display device of claim 17, wherein the first transistor, the third transistor, and the fifth transistor are turned off, the second transistor and the fourth transistor are turned on, and the current path is formed between the first output node and the first power line when the carry signal transmitted from the signal transmission unit of the previous stage is at the high voltage level and the second control node is discharged.

19. The display device of claim 17, wherein the first transistor, the third transistor, and the fifth transistor are turned on, the second transistor and the fourth transistor are turned off, and the current path is formed between the first output node and the second power line when the carry signal transmitted from the signal transmission unit of the previous stage is at the low voltage level and the second control node is charged.

20. The display device of claim 17, wherein the first transistor, the second transistor, the third transistor, and the fourth transistor are turned on, the fifth transistor is turned off, and the current paths are not formed between the first output node and the first and second power lines when the carry signal transmitted from the signal transmission unit of the previous stage is at the high voltage level and the second control node is charged.

21. The display device of claim 16, wherein the controller includes a sixth transistor, a seventh transistor, an eighth transistor, a ninth transistor, a tenth transistor, an eleventh transistor, a twelfth transistor, and a thirteenth transistor, wherein the sixth transistor includes a gate electrode to which an activation clock is input, a first electrode to which the carry signal is input from the signal transmission unit of the previous stage, and a second electrode connected to a buffer node, the seventh transistor includes a gate electrode to which the activation clock is input, a first electrode connected to the buffer node, and a second electrode connected to the first control node, the eighth transistor includes a gate electrode connected to the first control node, a first electrode connected to a sixth power line to which the high potential voltage is applied, and a second electrode connected to the buffer node, the ninth transistor includes a gate electrode connected to the buffer node, a first electrode connected to the second control node, and a second electrode connected to a seventh power line to which the low potential voltage is applied, the tenth transistor includes a gate electrode to which the second control node of the signal transmission unit of the previous stage is connected, a first electrode connected to the sixth power line, and a second electrode connected to a third node, the eleventh transistor includes a gate electrode connected to the buffer node, a first electrode connected to the third node, and a second electrode connected to an eighth power line to which the low potential voltage is applied, the twelfth transistor includes a gate electrode connected to the third node, a first electrode connected to the sixth power line, and a second electrode connected to the second control node, and the thirteenth transistor includes a gate electrode to which the carry signal is applied from the signal transmission unit of the previous stage, a first electrode connected to the second control node, and a second electrode connected to a ninth power line to which the low potential voltage is applied.

22. The display device of claim 21, wherein the controller further includes a second capacitor connected between the gate electrode of the twelfth transistor and the second electrode of twelfth transistor.

23. The display device of claim 15, wherein the first output unit further includes a first capacitor connected between the gate electrode of the first pull-up transistor and the first output node.

24. The display device of claim 14, wherein all transistors in the display panel including the data driver, the gate driver, and the pixel circuits are implemented with oxide thin film transistors (TFTs) including an n-channel type oxide semiconductor.

25. The display device of claim 14, further comprising a de-multiplexer array disposed between the data driver and the data lines, wherein the de-multiplexer array sequentially connects one channel of the data driver to the plurality of data lines and distributes in a time division manner the data voltage outputted from one channel of the data driver to the data lines.

* * * * *